United States Patent
Tamaoka

(10) Patent No.: US 7,615,947 B2
(45) Date of Patent: Nov. 10, 2009

(54) MOTOR DRIVING DEVICE AND MOTOR BRAKING METHOD

(75) Inventor: Shuji Tamaoka, Kyoto (JP)

(73) Assignee: Panasonic Corporation, Osaka (JP)

( * ) Notice: Subject to any disclaimer, the term of this patent is extended or adjusted under 35 U.S.C. 154(b) by 358 days.

(21) Appl. No.: 11/822,904

(22) Filed: Jul. 11, 2007

(65) Prior Publication Data

US 2008/0048597 A1   Feb. 28, 2008

(51) Int. Cl.
   *H02P 6/24* (2006.01)
(52) U.S. Cl. .................. 318/362; 318/365; 318/261; 318/273; 318/703; 318/445; 388/932
(58) Field of Classification Search .......... 318/362, 318/365, 261, 273, 703, 445
   See application file for complete search history.

(56) References Cited

U.S. PATENT DOCUMENTS

| | | | | |
|---|---|---|---|---|
| 5,604,412 A | * | 2/1997 | Okada et al. | 318/400.32 |
| 5,734,241 A | * | 3/1998 | Okada et al. | 318/366 |
| 6,020,700 A | * | 2/2000 | Tien | 318/400.38 |
| 6,140,782 A | * | 10/2000 | Chin | 318/400.31 |
| 6,456,032 B2 | * | 9/2002 | Itoh et al. | 318/727 |
| 6,496,002 B1 | * | 12/2002 | Kogiso et al. | 324/207.21 |
| 6,539,189 B2 | * | 3/2003 | Yanagida | 399/167 |
| 7,304,452 B2 | * | 12/2007 | Nagai et al. | 318/811 |

FOREIGN PATENT DOCUMENTS

| | | |
|---|---|---|
| JP | 2003-235287 | 8/2003 |
| JP | 2004-187454 | 7/2004 |

* cited by examiner

*Primary Examiner*—Rita Leykin
(74) *Attorney, Agent, or Firm*—McDermott Will & Emery LLP

(57) ABSTRACT

A motor driving device includes a brake mode control section for starting, when a brake instruction for a motor, braking of the motor in a reverse brake mode and then switching the reverse brake mode to a short brake mode; a cycle start detection section for receiving a rotation signal and detecting a start of a cycle of the rotation signal for each cycle; and a counter for performing, when the start of the cycle of the rotation signal is detected by the cycle start detection section, a count operation from an initial value. In the motor driving device, the brake mode control section detects that a value of the counter exceeds a threshold and performs switching from the reverse brake mode to the short brake mode with a delay from the detection.

9 Claims, 6 Drawing Sheets

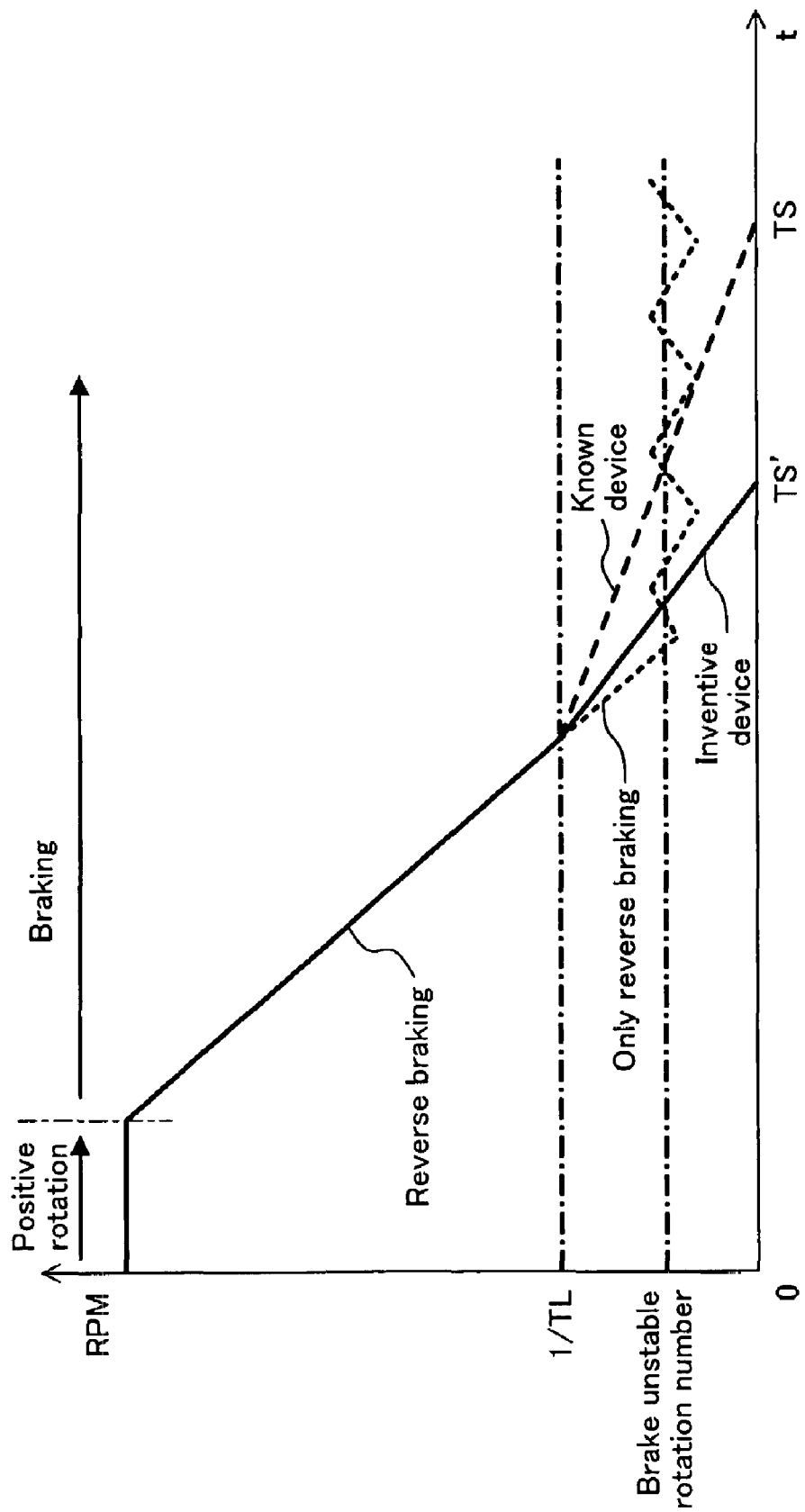

MOTOR DRIVING DEVICE AND MOTOR BRAKING METHOD

CROSS-REFERENCE TO RELATED APPLICATION

This non-provisional application claims priority under 35 U.S.C. §119(a) on Patent Application No. 2006-194424 filed in Japan on Jul. 14, 2006, the entire contents of which are hereby incorporated by reference.

BACKGROUND OF THE INVENTION

The present invention relates to a motor driving device, and more particularly relates to a motor braking technique in a device for driving a brushless motor by a drive signal generated with one cycle delay from a rotation signal output from a rotational position detector such as a hall.

Methods for braking a brushless motor include reverse braking and short braking. Reverse braking is a method in which a current having an opposite polarity to a polarity in positive rotation is supplied to motor coils of different phases to excite the motor coils, thereby reducing the rotation speed of a rotor. In reverse braking, braking force strongly affects and thus the rotation speed of the rotor is rabidly reduced. However, as the rotation speed of the rotor is reduced, braking becomes unstable. Thus, there might be cases where the motor can not be stopped. On the other hand, short braking is a method in which impedances between motor coils of different phases are lowered and then the impedances are short circuited to a ground voltage or a power supply voltage to eliminate an induction voltage of each phase, thereby braking the motor. In short braking, braking force does not affect as strongly as in reverse braking but the motor can be reliably stopped. Therefore, in a brushless motor, reverse braking and short braking have to be appropriately switched around to perform effective braking.

There is a known motor driving device in which an electrical angle rotation period is calculated and, when the period exceeds a threshold, a brake mode is switched from a reverse brake mode to a short brake mode (see, for example, Japanese Laid-Open Publication No. 2003-235287). Accordingly, a motor can be stopped in a short time.

Moreover, as a device for driving a brushless motor or the like, there is a device in which detection intervals for a reference position of a rotor are measured while the rotor is rotating, a drive signal having an approximate sinusoidal waveform is generated based on a rotation period of the rotor, i.e., the electrical angle rotation period, and energization of phases of a motor is controlled according to the drive signal (see, for example, Japanese Laid-Open Publication No. 2004-187454).

In the technique used in the latter one of the above-described devices, the motor is driven by the drive signal having a non-deformed approximate sinusoidal waveform. Thus, excellent motor drive control characteristics at a constant speed can be achieved. However, in the motor driving device, when reverse brake is applied, a deformed waveform of an actual motor induction voltage does not match a non-deformed waveform of the motor drive signal in some part, so that speed acceleration control is performed in the part. Specifically, in the motor driving device, the drive signal is generated with one cycle delay from a rotation signal representing detected rotation of the motor, so that a percentage of the mismatch part between the motor induction voltage and the motor drive signal is increased where the speed of the motor is decelerated. This might cause a case where deceleration and acceleration of the motor are repeated and then the motor can not be stopped.

To cope with this, the technique used in the former one of the above-described devices is applied to the latter motor driving device so that motor braking is started in a reverse brake mode and, when the electrical angle rotation period of the motor exceeds a threshold, the brake mode is switched to a short brake mode. Thus, the motor might be reliably stopped in a shorter time. However, even immediately before the reverse brake mode is switched to the short brake mode, it is uncertain which the motor has been subjected to deceleration control or acceleration control. If the motor has been subjected to acceleration control, it takes a longer time to stop the motor after a switching timing to the short brake mode.

SUMMARY OF THE INVENTION

In view of the above-described problems, the present invention has been devised to realize switching from a reverse brake mode to a short brake mode at a proper timing in a motor driving device for driving the motor according to a drive signal generated with one cycle delay from a rotation signal representing detected rotation of the motor, thereby stopping the motor in a shorter time.

As a motor driving device for driving a motor according to a drive signal generated with one cycle delay from a rotation signal representing detected rotation of the motor, means which has been devised by the present invention to solve the above-described problems includes: a brake mode control section for starting, when receiving a brake instruction for the motor, braking of the motor in a reverse brake mode and then switching the reverse brake mode to a short brake mode; a cycle start detection section for receiving the rotation signal and detecting a start of a cycle of the rotation signal for each cycle; and a counter for performing, when the start of the cycle of the rotation signal is detected by the cycle start detection section, a count operation from an initial value. In the motor driving device, the brake mode control section detects that a value of the counter exceeds a threshold and performs switching from the reverse brake mode to the short brake mode with a delay from the detection.

As a motor braking method used in a motor driving device for driving a motor according to a drive signal generated with one cycle delay from a rotation signal representing detected rotation of the motor, in means which has been devised by the present invention to solve the above-described problems, braking of the motor is started in a reverse mode and, when a rotation speed of the motor becomes lower than a lower limit value, the reverse brake mode is switched to a short brake mode with a delay from a start timing of a cycle of the rotation signal.

According to the present invention, a deceleration torque of reverse braking can be made sufficiently effect the motor immediately before switching from the reverse brake mode to the short brake mode, so that the motor can be stopped quickly after the brake mode is switched to the short brake mode.

Specifically, the motor driving device may further include a timer for detecting that a predetermined time has elapsed since the detection of the start of the cycle of the rotation signal by the cycle start detection section. In the motor driving device, when the brake mode control section detects that the value of the counter exceeds the threshold and then the timer detects that the predetermined time has elapsed, the brake mode control section performs switching from the reverse brake mode to the short brake mode.

More specifically, the timer includes: a pulse signal generation section for outputting a pulse signal at intervals of a value obtained by dividing the value of the counter when the start of the cycle of the rotation signal is detected by the cycle start detection section by a predetermined integer; a pulse counter for performing, when the start of the cycle of the rotation signal is detected by the cycle start detection section, a count operation for the pulse signal from an initial value; and a count detection section for detecting that a value of the pulse counter has reached a threshold.

Moreover, specifically, the motor braking method includes the steps of: detecting a start of the cycle of the rotation signal for each cycle; measuring a length of the cycle of the rotation signal for each cycle; detecting that the measured cycle length of the rotation signal has exceeded a threshold; detecting that a predetermined time has elapsed since the detection of start of the cycle of the rotation signal; and switching from the reverse brake mode to the short brake mode when it is detected that the measured cycle length of the rotation signal has exceeded the threshold and it is detected that the predetermined time has elapsed since the detection of the start of the cycle of the rotation signal.

The predetermined time preferably corresponds to around half of the value of the counter when the start of the cycle of the rotation signal is detected by the cycle start detection section or the predetermined time preferably corresponds to around half of the measured cycle length of the rotation signal. Specifically, the predetermined time may correspond to half of the value of the counter when the start of the cycle of the rotation signal is detected by the cycle start detection section or the predetermined time may correspond to half of the measured cycle length of the rotation signal.

Thus, a deceleration torque of reverse braking can be made sufficiently effect the motor immediately before switching from the reverse brake mode to the short brake mode.

BRIEF DESCRIPTION OF THE DRAWINGS

FIG. 6 is a graph showing motor brake characteristics.

DESCRIPTION OF THE PREFERRED EMBODIMENTS

Figure 1:
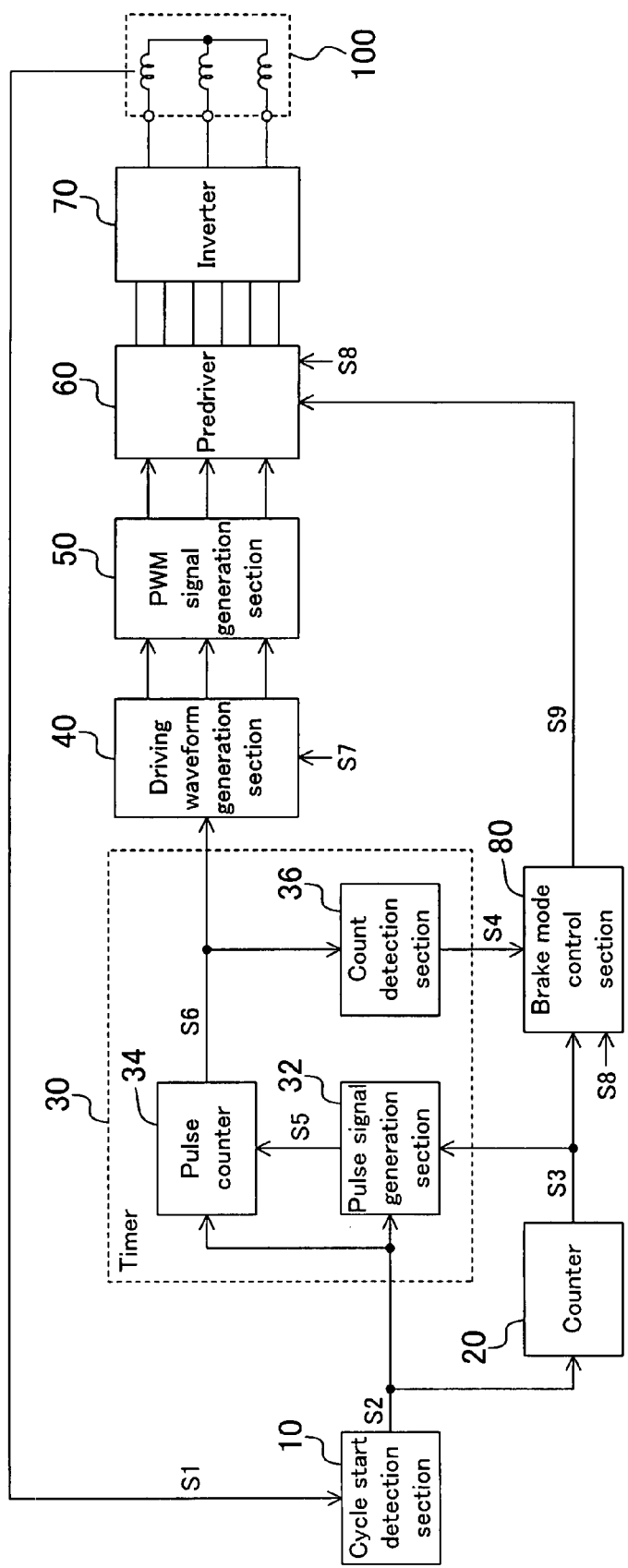
FIG. 1 is a block diagram illustrating a configuration of a motor driving device according to the present invention.
Figure 2:
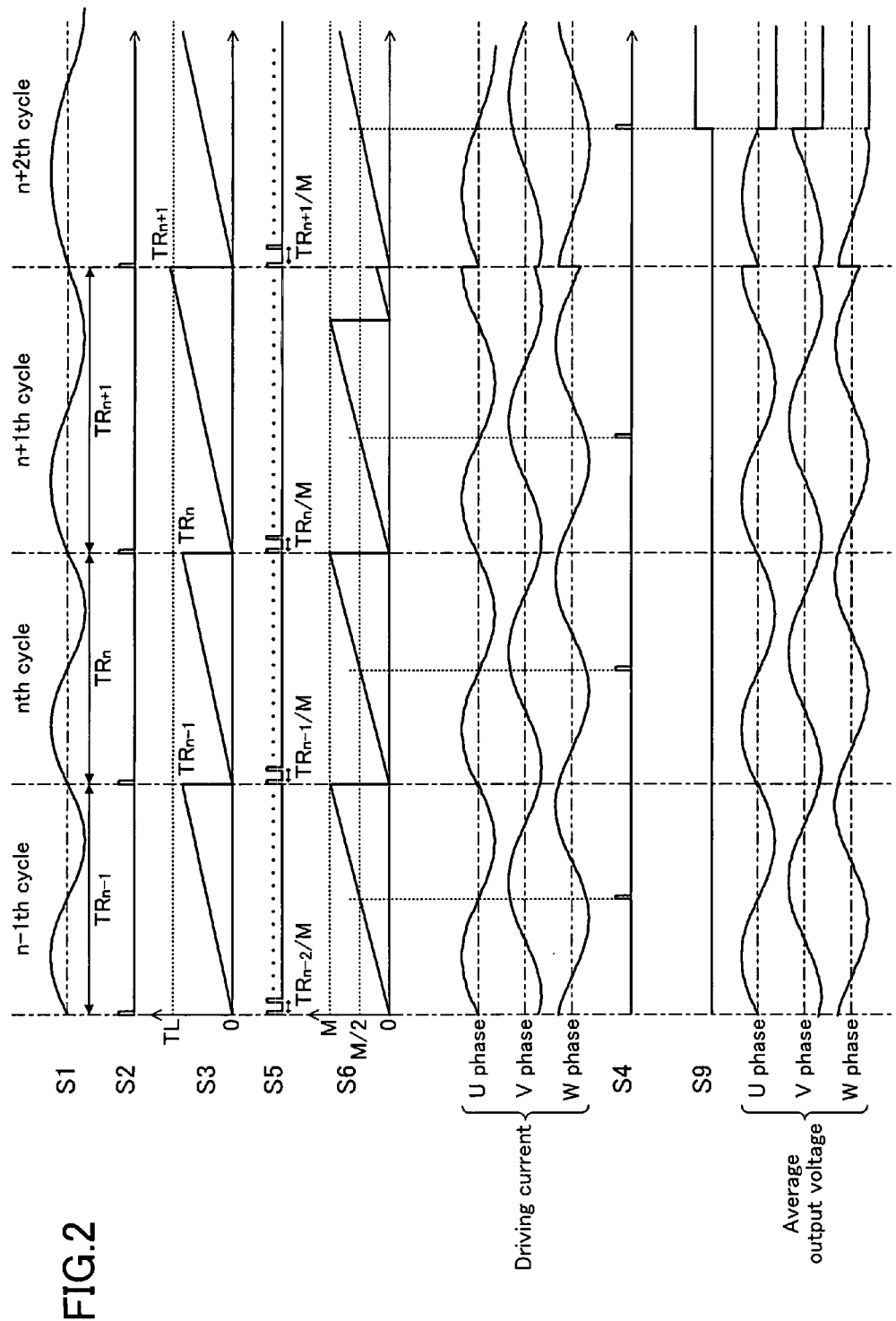
FIG. 2 is a graph showing signals and electric characteristics in the motor driving device.

Hereafter, best modes for carrying out the present invention will be described with reference to the accompanying drawings. FIG. 1 is a block diagram illustrating a configuration of a motor driving device according to the present invention. The motor driving device includes a cycle start detection section 10, a counter 20, a timer 30, a driving waveform generation section 40, a PWM signal generation section 50, a predriver 60, an inverter 70 and a brake mode control section 80 and drives a three-phase (U phase, V phase and W phase) brushless motor 100. FIG. 2 is a graph showing signals and electric characteristics in the motor driving device.

The cycle start detection section 10 receives a rotation signal S1 representing detected rotation of the motor 100 and outputs a signal S2 indicating that the cycle is started in each cycle of the rotation signal S1. The rotation signal S1 is a signal which periodically varies according to the rotation of the motor 100 and is, for example, a hall sensor signal, an FG signal or the like. When the motor 100 is sensorless, the rotation signal S1 may be an induction voltage (or current). When the rotation signal S1 is a hall sensor signal, a cycle of the rotation signal S1 starts at a timing when the hall sensor detects a reference position of a rotor. The number of the hall sensor may be one (that is, so-called a single-sensor method). When the rotation signal S1 is an induction voltage, a cycle of the rotation signal S1 starts at a timing when with a neutral point voltage of the motor assumed to be a reference, polarity is reversed from the negative polarity to the positive polarity or the positive polarity to the negative polarity.

When the counter 20 receives the signal S2, the counter 20 resets a count value, starts a count-up operation based on an internal or external clock signal and outputs a signal S3 indicating the count value. That is, the counter 20 measures output intervals of the signal S2 to substantially measure a cycle length of the rotation signal S1.

When the timer 30 receives the signal S2 and then a time corresponding to half of the cycle length of the rotation signal S1 which has been measured by the counter 20 has elapsed, the timer 30 outputs a signal S4. That is, the timer 30 detects that a predetermined time has elapsed since detection of the start of the cycle of the rotation signal S1. Specifically, the timer 30 includes a pulse signal generation section 32, a pulse counter 34 and a count detection section 36.

The pulse signal generation section 32 outputs a pulse signal S5 at intervals of a value obtained by dividing a value of the signal S3 by a predetermined integer. In the n+1th cycle, the value of the signal S3 denotes a cycle length $TR_n$ of the nth cycle of the rotation signal S1. If the above-described predetermined integer is assumed to be M, an output cycle of the pulse signal S5 is denoted as $TR_n/M$. The cycle gives an electrical angle of 360/M degrees, which is referred as a standard when a current signal to be energized to each phase of the motor 100 is generated. As described above, the rotation signal S1 is generated with one cycle delay from the rotation signal S1. Accordingly, when the rotation signal S1 is in the kth cycle, an output cycle of the pulse signal S5 is $TR_{k-1}/M$.

The pulse counter 34 counts up the pulse signal S5 and resets the count value every time when the count value becomes M. Moreover, the pulse counter 34 resets the count value when the pulse counter 34 receives the signal S2. The count value is output as a signal S6. The electrical angle of a current signal to be energized to each phase of the motor 100 is calculated based on the count value (signal S6). Specifically, an electrical angle of a current signal to be energized to a U phase of the motor 100 is given as a value obtained by multiplying a value of the pulse counter 34 by the electrical angle of 360/M degrees. Moreover, respective electrical angles of current signals energized to a V phase and a W phase are given as values shifted from the U phase by 120 degrees and 240 degrees, respectively.

The count detection section 36 monitors the signal S6 and outputs, when it is detected that the value of the pulse counter 34 reaches M/2, the signal S4. Specifically, the count detection section 36 outputs the signal S4 when a time corresponding to an electrical angle of 180 degrees from a start of induction to the U phase of the motor 100 has elapsed.

The driving waveform generation section 40 generates a driving waveform of sine wave for each phase of the motor 100 based on the signal S6 and a torque instruction signal S7. An amplitude of the driving wave is determined based on the torque instruction signal S7. The PWM signal generation section 50 performs pulse width modulation for each driving waveform generated by the driving waveform generation section 40 to generate a PWM signal for each phase of the motor 100. The predriver 60 performs switching control to a transistor (not shown) in the inverter 70 according to the PWM signals. Thus, a current of an approximately sine wave is supplied to each phase in the motor 100 such that currents for different phases are shifted from one another by 120 degrees. Moreover, when the predriver 60 receives a brake instruction signal S8, the predriver 60 brakes the motor 100 in either one of the reverse brake mode or the short brake mode according to a brake mode signal S9 output from a brake mode control section 80 which will be described later.

When the brake mode control section 80 receives the brake instruction signal S8, the brake mode control section 80 first starts control in the reverses brake mode to sufficiently reduce the rotation speed of the motor 100 and switches its brake mode to the short brake mode to stop the motor 100. Brake mode switching is performed by changing a logic value of the brake mode signal S9. Specifically, when the brake mode control section 80 receives the brake instruction signal S8, the brake mode control section 80 sets the brake mode signal S9 to "L" to select the reverse brake mode. Then, a cycle length of the rotation signal S1 indicated by the signal S3 is compared to a threshold. When it is detected that the cycle length is larger than the threshold and then the brake mode control section 80 receives the signal S4, the brake mode signal S9 is set to be "H" to switch the brake mode to the short brake mode. Comparison between the cycle length of the rotation signal S1 indicated by the signal S3 and the threshold may be performed successively or at a start timing of a cycle of the rotation signal S1. Thus, the brake mode control section 80 does not switch the brake mode to the short brake mode when it is detected that the rotation speed of the motor 100 is lower than a lower limit value, but switches the brake mode to the short brake mode with a delay from a timing of the detection. Specifically, after a time corresponding to half of the cycle of the rotation signal S1 output at the detection has passed from the timing of the detection, the brake mode control section 80 performs the switching.

Figure 3:
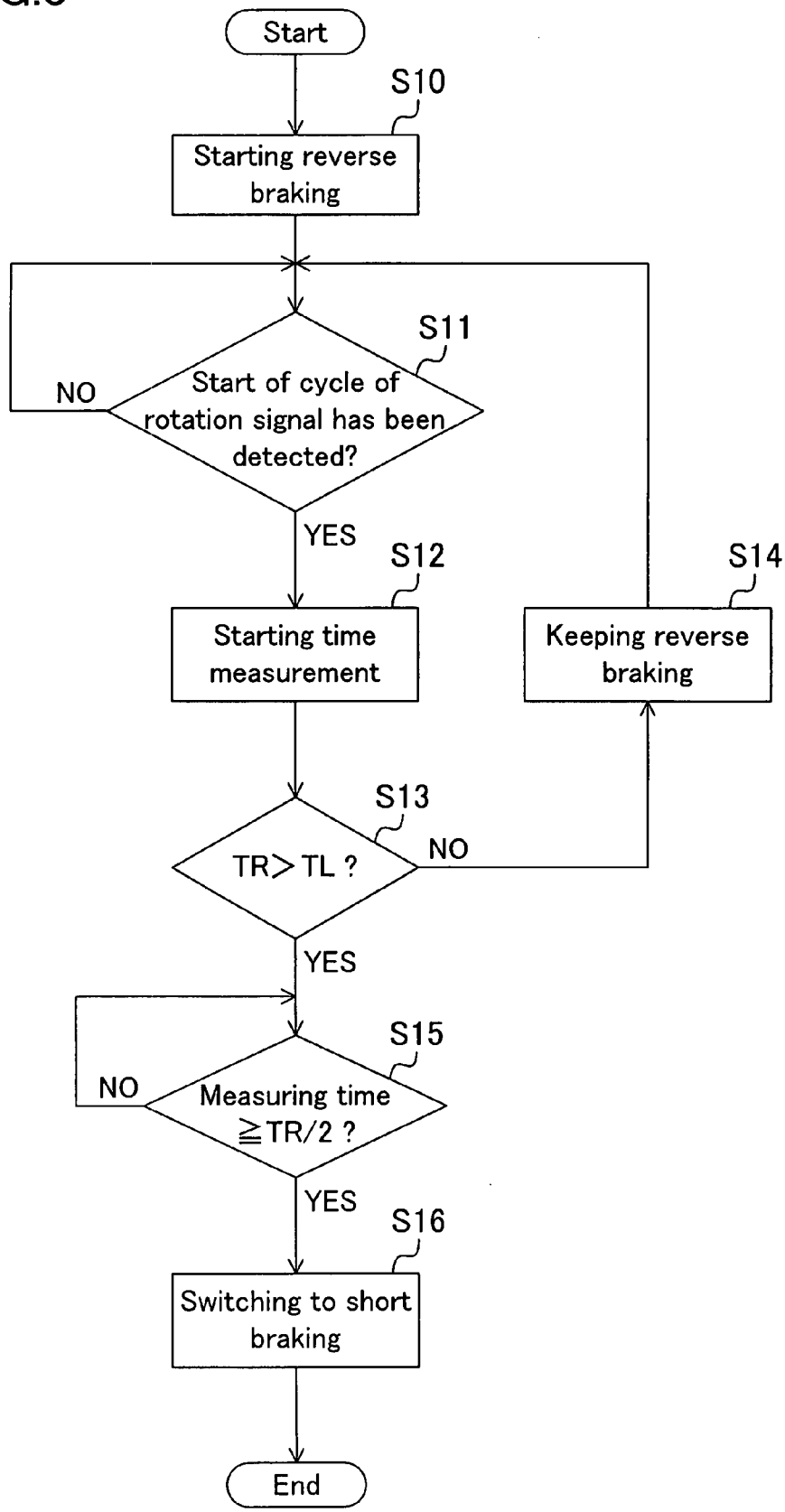
FIG. 3 is a flowchart of a motor braking operation by the motor driving device of FIG. 1.

Next, a motor braking operation by the motor driving device of the present embodiment will be described with reference to a flowchart of FIG. 3. First, braking of the motor 100 is started in the reverse brake mode (Step S10). When a start of a cycle of the rotation signal S1 is detected (Yes in Step S11), the timer 30 starts measuring a time from an initial value (Step S12). If a cycle length TR of the rotation signal S1 which has been measured by the counter 20 is equal to or less than a threshold TL (No in Step S13), the reverse brake mode is kept (Step S14) and returns to Step S11. On the other hand, assume that the cycle length TR of the rotation signal S1 is larger than the threshold TL (Yes in Step S13). Then, after a time corresponding to half (TR/2) of the cycle length TR of the rotation signal S1 (Yes in Step S15) has lapsed as the time measured by the timer 30, the brake mode is switched from the reverse brake mode to the short brake mode (Step S16).

Figure 4:
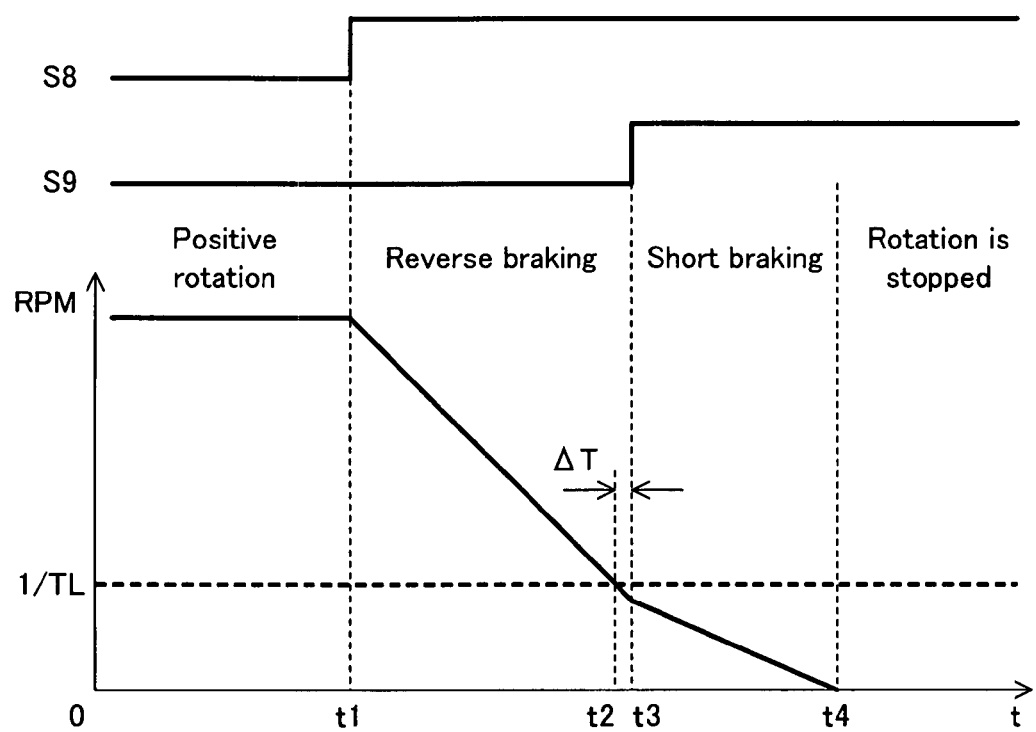
FIG. 4 is a graph showing timing for a motor braking operation by the motor driving device of FIG. 1.

FIG. 4 is a graph showing timing for a motor braking operation by the motor driving device of the present embodiment. With a brake instruction signal S8 turned to "H" at a time t1, positive rotation driving is completed and reverse braking is started. Then, a motor rotation speed (RPM) reaches a threshold 1/TL at a time t2 and then the brake mode is switched from the reverse brake mode to the short brake mode at a time t3 after a lapse of $\Delta T$ from the time t2. Thereafter, the motor 100 continues decelerating and is completely stopped at a time t4. In the motor driving device of the present embodiment, a switching timing to the short brake mode is delayed by $\Delta T$ from the time t2 which is a switching timing in a known device. This delay is made by the timer 30.

Figure 5:
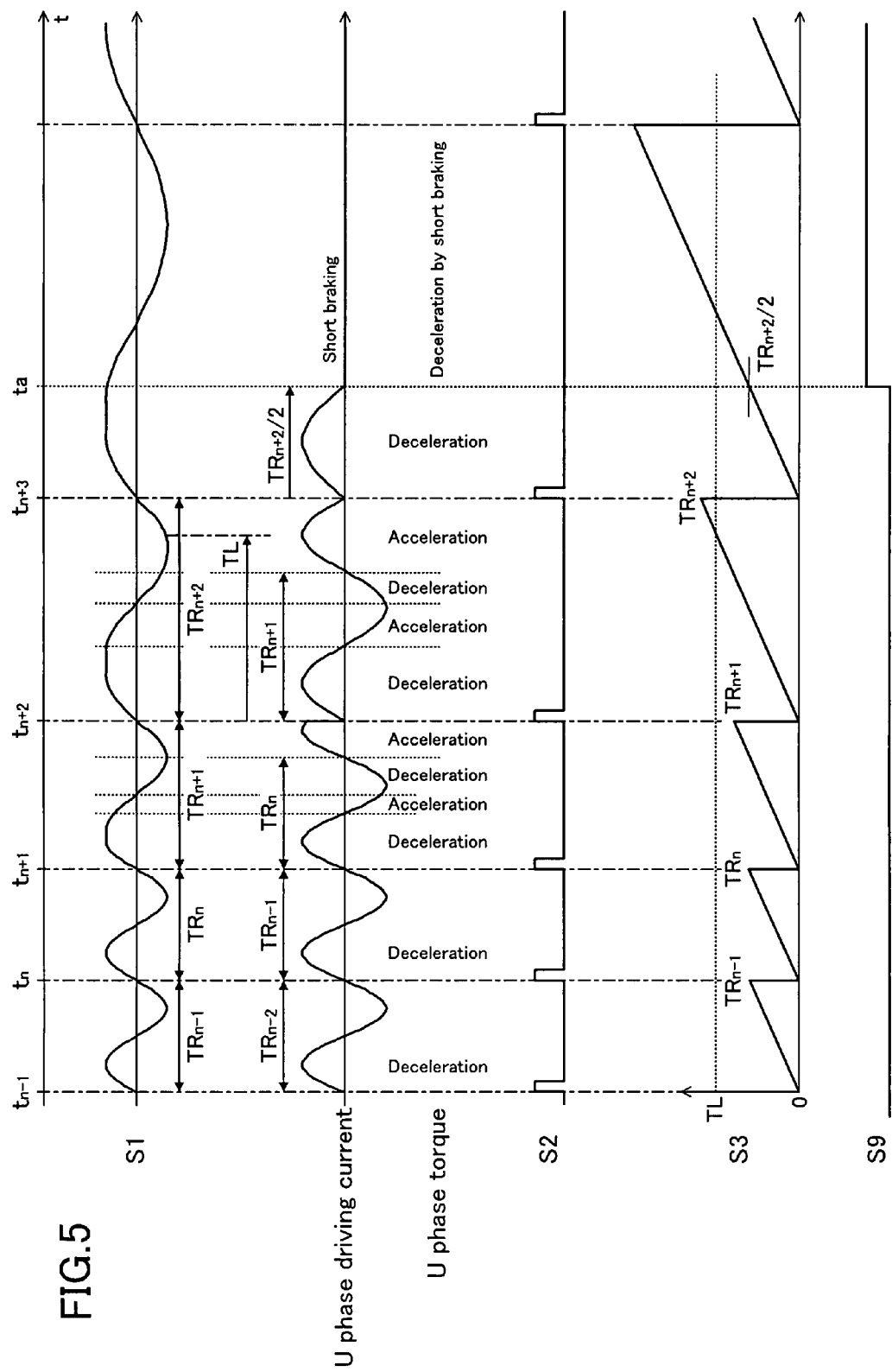
FIG. 5 is a timing chart for motor braking by the motor driving device of FIG. 1.

FIG. 5 is a timing chart for motor braking by the motor driving device of the present embodiment. When reverse braking is started, a current having the same polarity as a polarity of the rotation signal S1 is energized to the U phase of the motor 100, so that a deceleration torque is generated in the U phase. As described above, a cycle of the U phase driving current is delayed for one cycle from the rotation signal S1. Accordingly, after a time $t_{n+1}$, as a cycle $TR_k$ of the rotation signal S1 is rapidly increased, there is part in which respective polarities of the rotation signal S1 and the U-phase driving current do not match, so that an acceleration torque is generated in the mismatch part. Starts of cycles of the rotation signal S1 and the cycle length $TR_k$ are shown by the signal S2 and the signal S3, respectively. The count value (signal S3) of the counter 20 does not reach the threshold TL in the cycles until the time $t_{n+2}$, but the count value exceeds the threshold TL in the n+2th cycle from the time $t_{n+2}$ to the time $t_{n+3}$. Accordingly, it is detected that the cycle length $TR_{n+2}$ of the rotation signal S1 has exceeded the threshold TL at the time $t_{n+3}$. However, the brake mode is not immediately switched to the short brake mode. When half cycle ($TR_{n+2}/2$) of the cycle length $TR_{n+2}$ has elapsed (time $t_a$), the brake mode signal S9 is turned to "H" and then the brake mode is switched to the short brake mode.

FIG. 6 is a graph showing motor brake characteristics. In the case where only reverse braking is applied, the motor 100 repeats acceleration and deceleration around a brake unstable rotation number and can not be completely stopped. On the other hand, as in the known technique, if the brake mode is switched to the short brake mode after the motor rotation number has reached the threshold 1/TL, the motor 100 is completely stopped at a time TS. Furthermore, according to a motor brake method according to the present invention, the brake mode is switched to the short brake mode after the motor 100 is sufficiently decelerated, the motor 100 can be completely stopped at the time TS' which is earlier than the time TS.

As has been described, according to this embodiment, a motor is sufficiently decelerated by a deceleration torque of reverse braking immediately before switching from the reverse brake mode to the short brake mode, so that the motor can be stopped quickly after the brake mode is switched to the short brake mode. That is, the motor can be stopped in a short time.

In this embodiment, for switching from the reverse brake mode to the short brake mode, the rotation signal S1 is delayed for half a cycle. However, this is merely according to a logic value and the present invention is not limited to this delay amount. For example, the delay amount may be ¼ of cycle of the rotation signal S1 or may be ¾ of cycle of the rotation signal S1. The delay amount may be determined according to characteristics of an actual motor.

A motor driving device according to the present invention can stop a motor quickly. Therefore, the motor driving device of the present invention is useful as a driving device for a disk motor in an optical disk device.

What is claimed is:

1. A motor driving device for driving a motor according to a drive signal generated with one cycle delay from a rotation signal representing detected rotation of the motor, the device comprising:
    a brake mode control section for starting, when receiving a brake instruction for the motor, braking of the motor in a reverse brake mode and then switching the reverse brake mode to a short brake mode;

a cycle start detection section for receiving the rotation signal and detecting a start of a cycle of the rotation signal for each cycle; and a counter for performing, when the start of the cycle of the rotation signal is detected by the cycle start detection section, a count operation from an initial value, wherein the brake mode control section detects that a value of the counter exceeds a threshold and performs switching from the reverse brake mode to the short brake mode with a delay from the detection.

2. The motor driving device of claim 1, further comprising a timer for detecting that a predetermined time has elapsed since the detection of the start of the cycle of the rotation signal by the cycle start detection section, wherein when the brake mode control section detects that the value of the counter exceeds the threshold and then the timer detects that the predetermined time has elapsed, the brake mode control section performs switching from the reverse brake mode to the short brake mode.

3. The motor driving device of claim 2, wherein the timer comprises:

a pulse signal generation section for outputting a pulse signal at intervals of a value obtained by dividing the value of the counter when the start of the cycle of the rotation signal is detected by the cycle start detection section by a predetermined integer;

a pulse counter for performing, when the start of the cycle of the rotation signal is detected by the cycle start detection section, a count operation for the pulse signal from an initial value; and a count detection section for detecting that a value of the pulse counter has reached a threshold.

4. The motor driving device of claim 2, wherein the predetermined time corresponds to around half of the value of the counter when the start of the cycle of the rotation signal is detected by the cycle start detection section.

5. The motor driving device of claim 4, wherein the predetermined time corresponds to half of the value of the counter when the start of the cycle of the rotation signal is detected by the cycle start detection section.

6. A motor braking method used in a motor driving device for driving a motor according to a drive signal generated with one cycle delay from a rotation signal representing detected rotation of the motor, wherein braking of the motor is started in a reverse mode and, when a rotation speed of the motor becomes lower than a lower limit value, the reverse brake mode is switched to a short brake mode with a delay from a start timing of a cycle of the rotation signal.

7. The motor braking method of claim 6, the method comprising the steps of:

detecting a start of the cycle of the rotation signal for each cycle;

measuring a length of the cycle of the rotation signal for each cycle;

detecting that the measured cycle length of the rotation signal has exceeded a threshold;

detecting that a predetermined time has elapsed since the detection of the start of the cycle of the rotation signal; and switching from the reverse brake mode to the short brake mode when it is detected that the measured cycle length of the rotation signal has exceeded the threshold and it is detected that the predetermined time has elapsed since the detection of the start of the cycle of the rotation signal.

8. The motor braking method of claim 7, wherein the predetermined time corresponds to around half of the measured cycle length of the rotation signal.

9. The motor braking method of claim 8, wherein the predetermined time corresponds to half of the measured cycle length of the rotation signal.

* * * * *